March 15, 1966 R. F. COBAUGH 3,239,918
METHOD OF MAKING AN ELECTRICAL CONNECTION
Filed Feb. 5, 1962 12 Sheets-Sheet 1
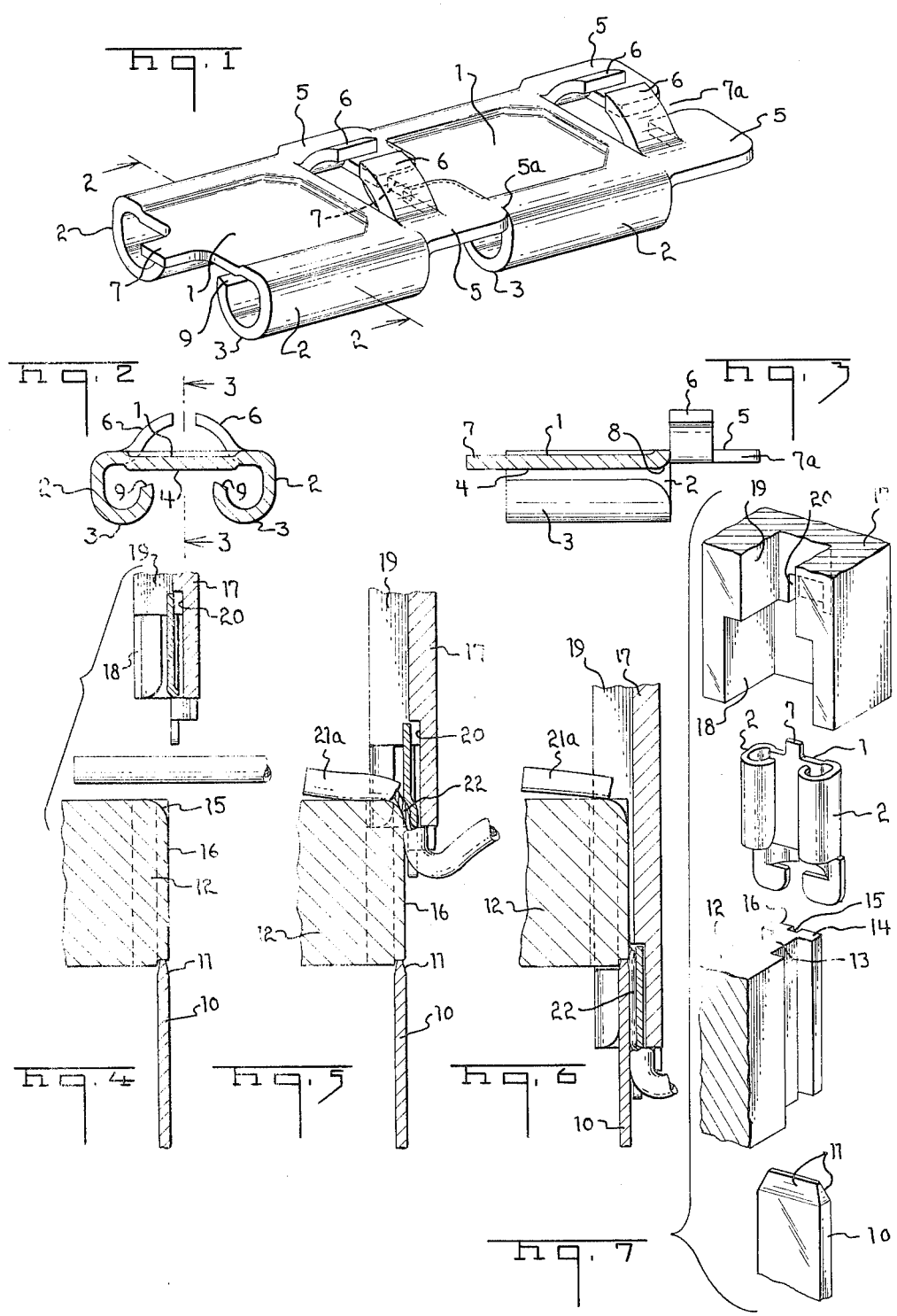

March 15, 1966  R. F. COBAUGH  3,239,918
METHOD OF MAKING AN ELECTRICAL CONNECTION
Filed Feb. 5, 1962  12 Sheets-Sheet 2
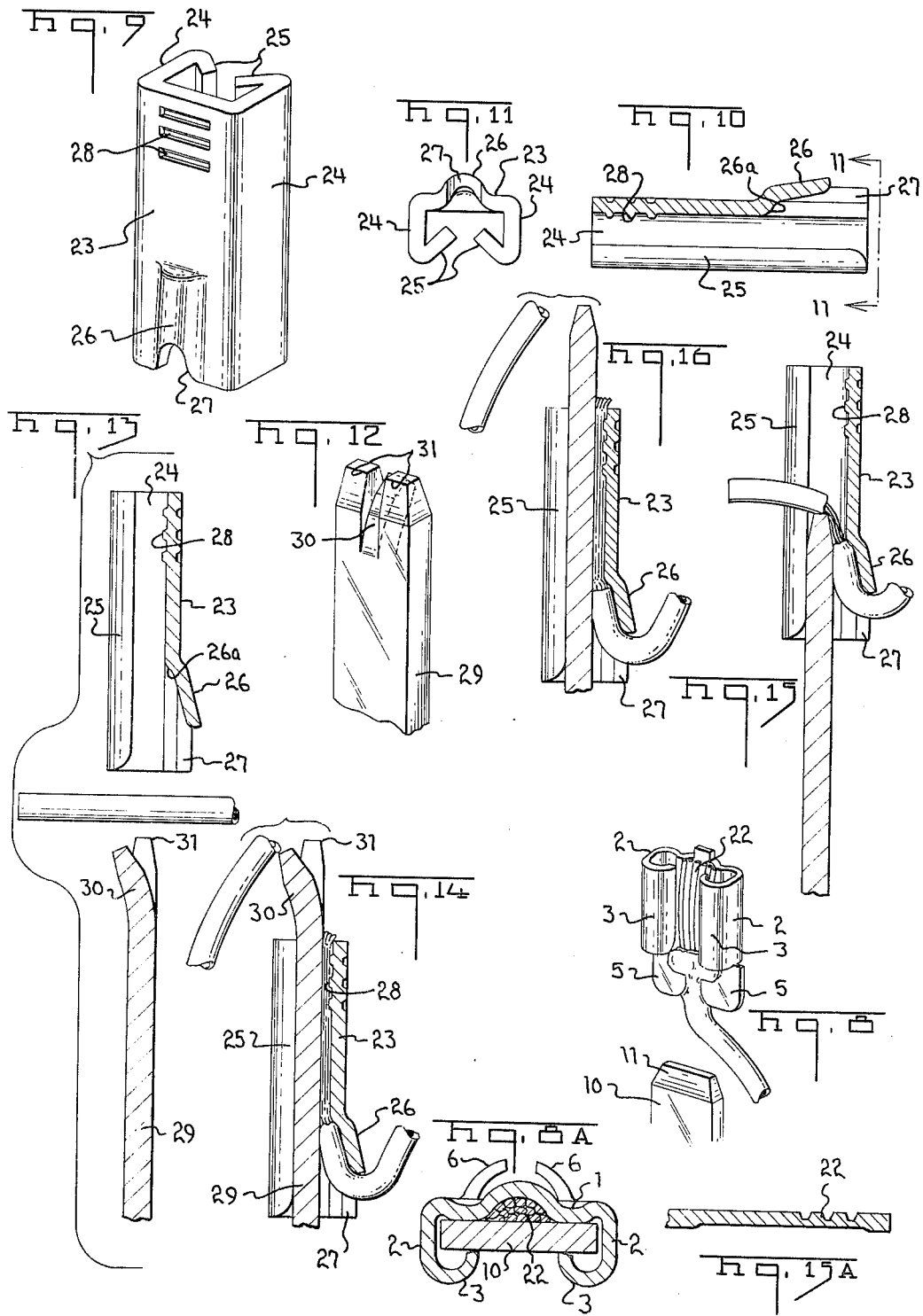

March 15, 1966  R. F. COBAUGH  3,239,918
METHOD OF MAKING AN ELECTRICAL CONNECTION
Filed Feb. 5, 1962  12 Sheets-Sheet 3
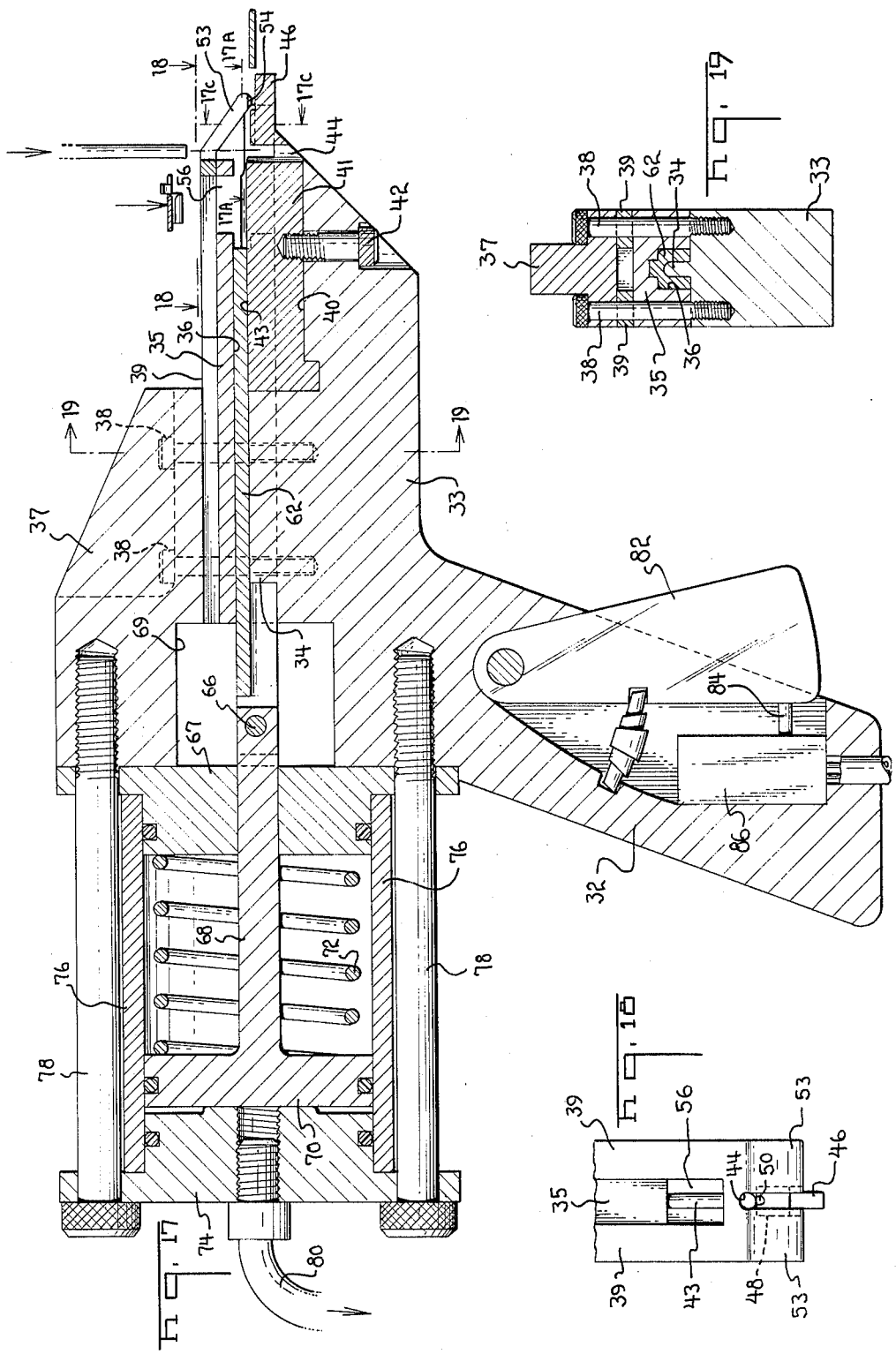

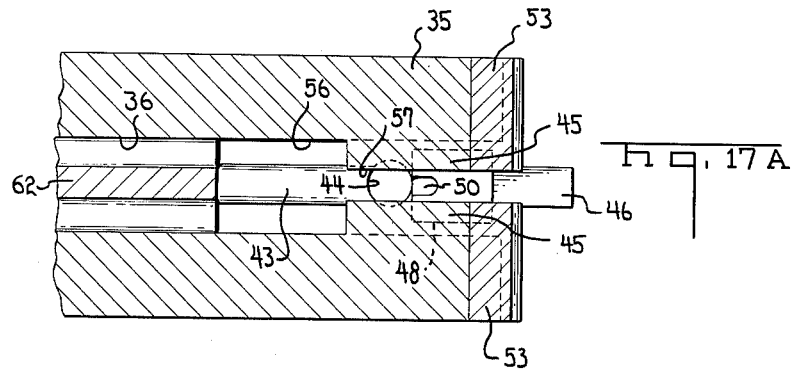
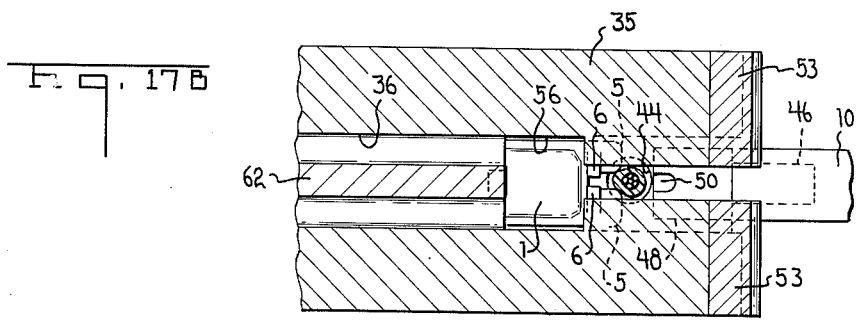
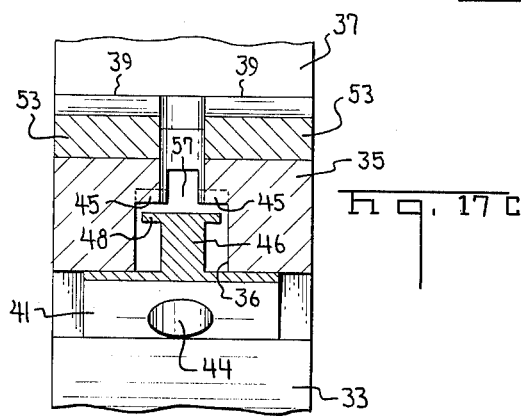

March 15, 1966  R. F. COBAUGH  3,239,918
METHOD OF MAKING AN ELECTRICAL CONNECTION
Filed Feb. 5, 1962  12 Sheets-Sheet 5
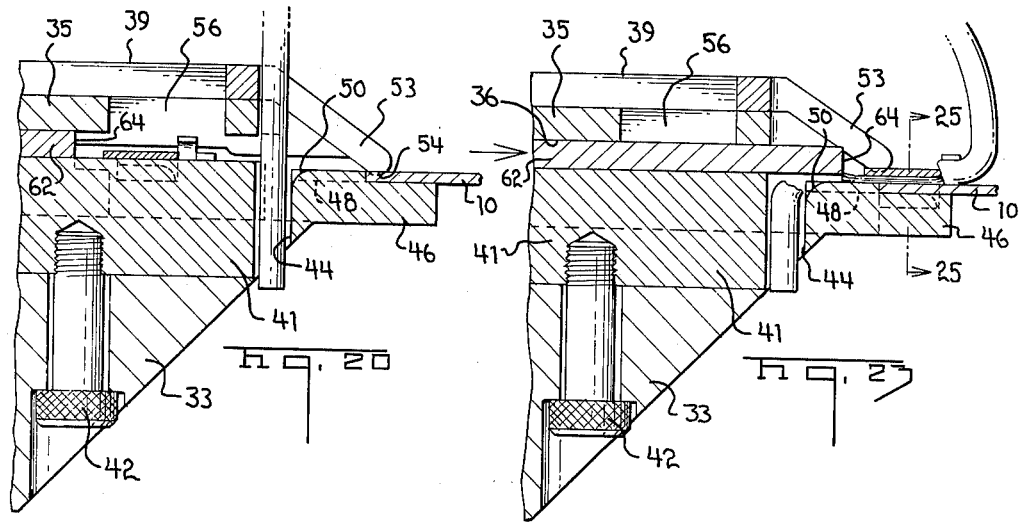
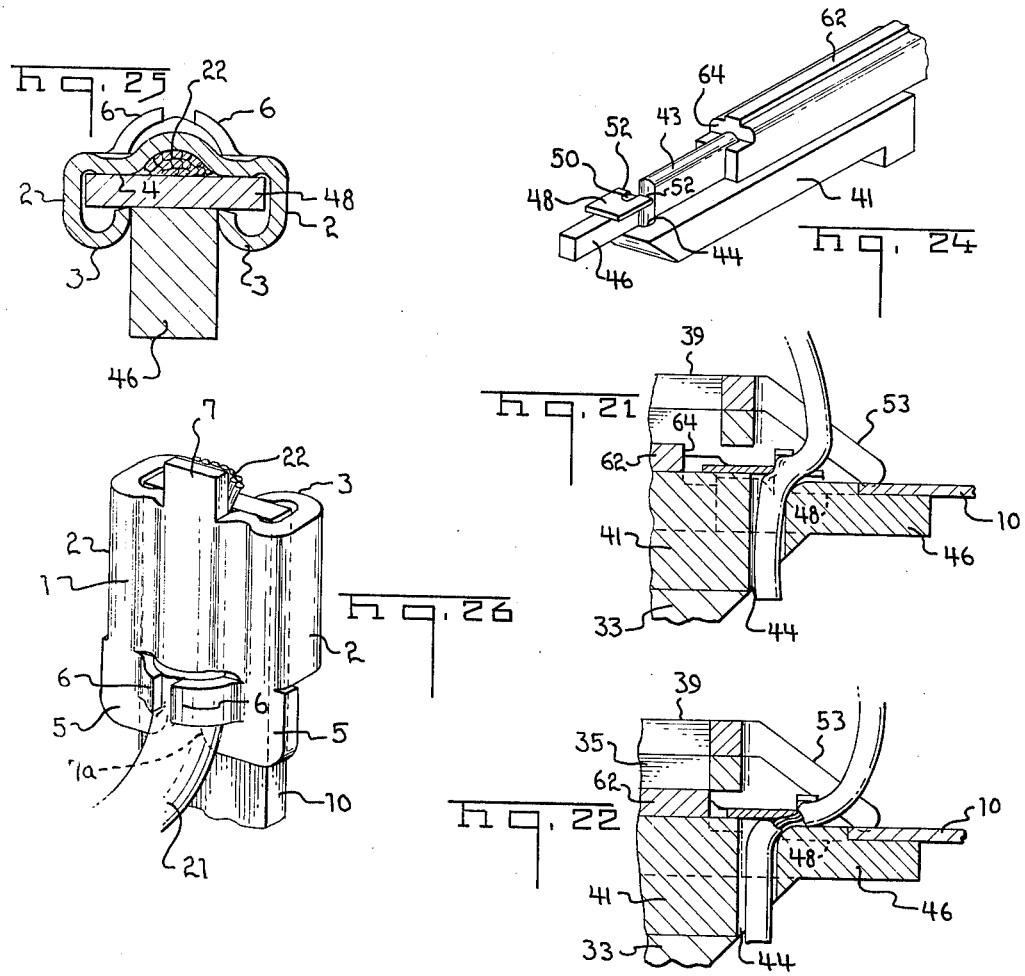

March 15, 1966   R. F. COBAUGH   3,239,918
METHOD OF MAKING AN ELECTRICAL CONNECTION
Filed Feb. 5, 1962   12 Sheets-Sheet 6

March 15, 1966  R. F. COBAUGH  3,239,918
METHOD OF MAKING AN ELECTRICAL CONNECTION
Filed Feb. 5, 1962  12 Sheets-Sheet 7
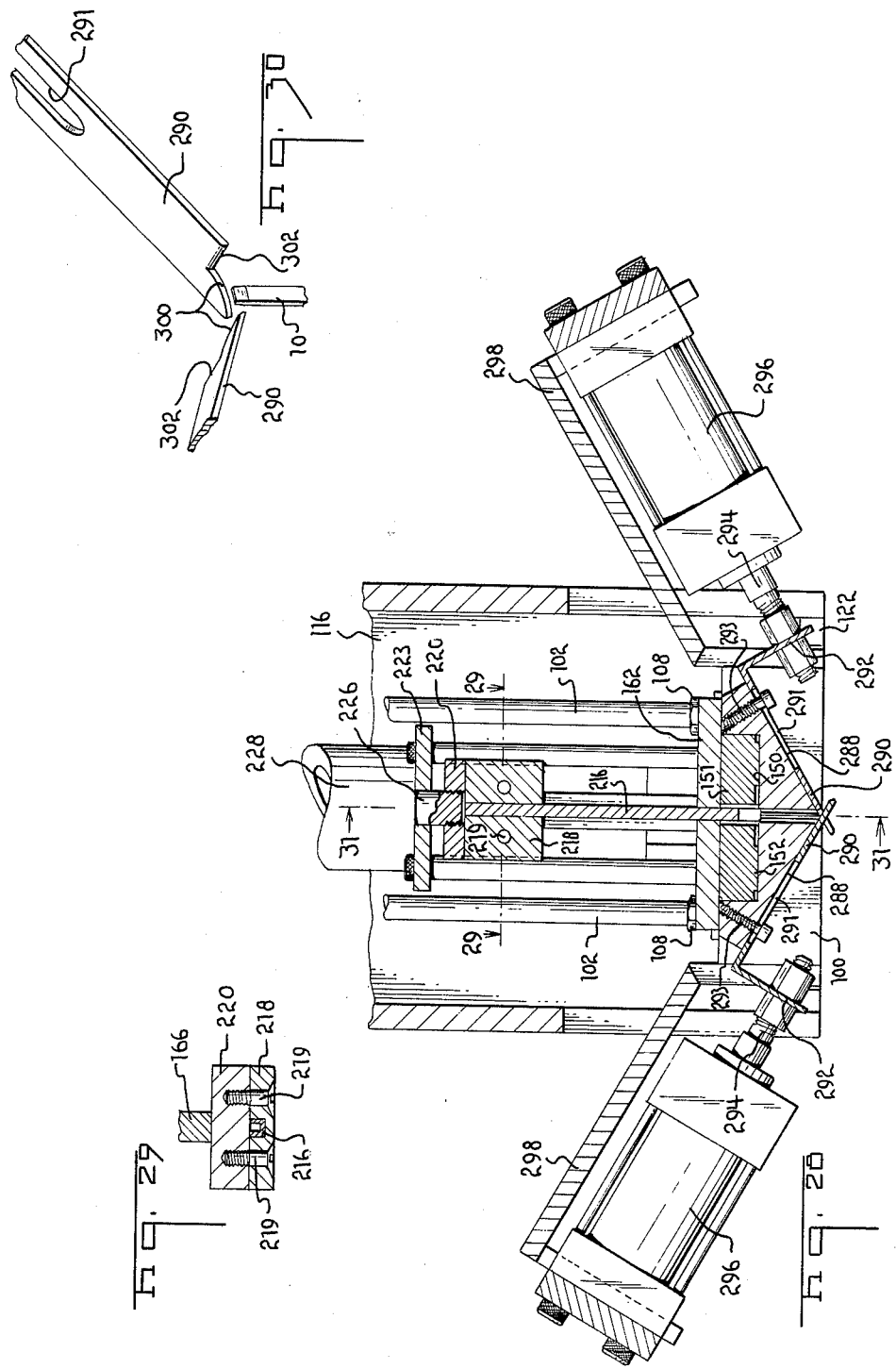

March 15, 1966 R. F. COBAUGH 3,239,918
METHOD OF MAKING AN ELECTRICAL CONNECTION
Filed Feb. 5, 1962 12 Sheets-Sheet 8
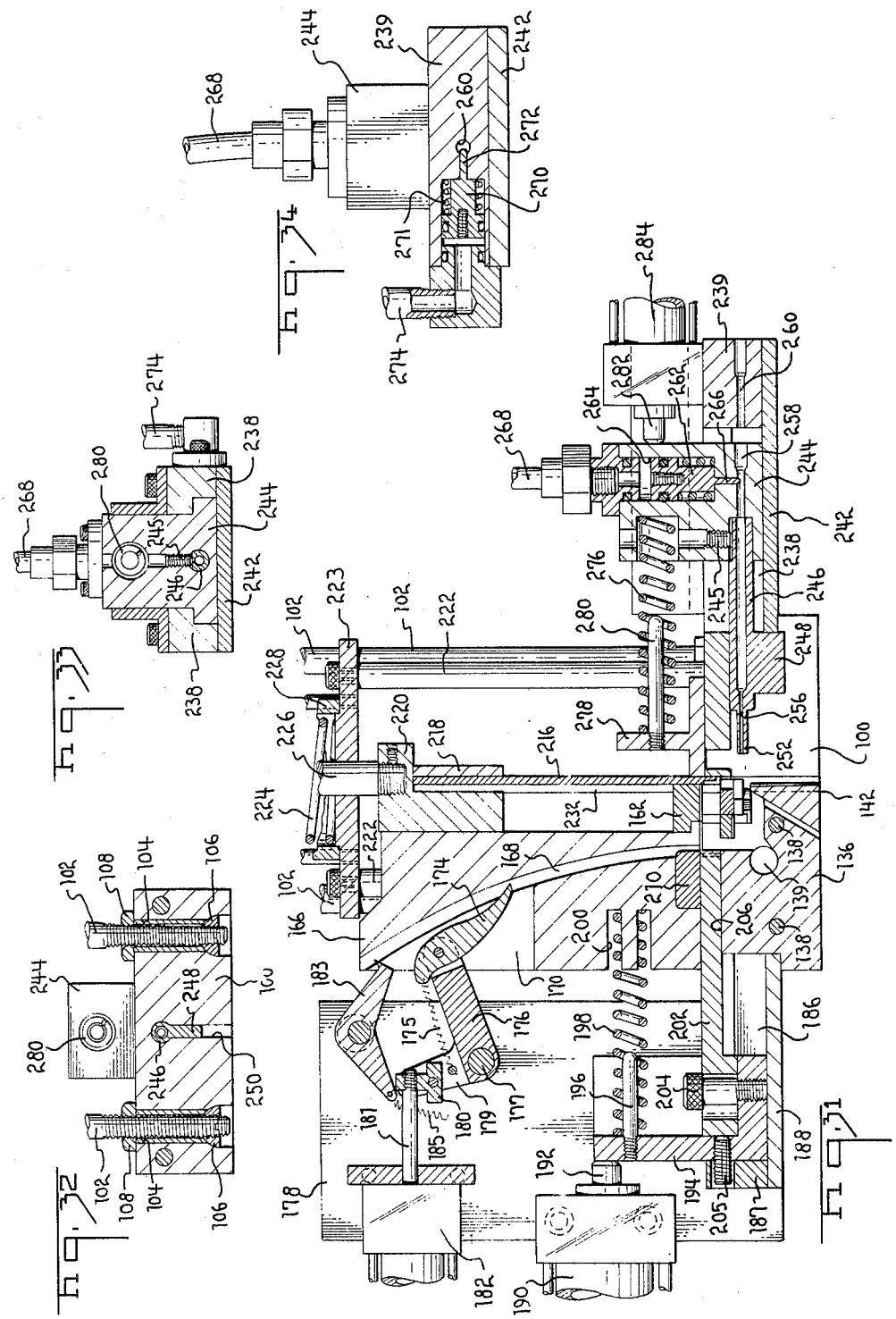

March 15, 1966 R. F. COBAUGH 3,239,918
METHOD OF MAKING AN ELECTRICAL CONNECTION
Filed Feb. 5, 1962 12 Sheets-Sheet 9

March 15, 1966  R. F. COBAUGH  3,239,918
METHOD OF MAKING AN ELECTRICAL CONNECTION
Filed Feb. 5, 1962  12 Sheets-Sheet 10

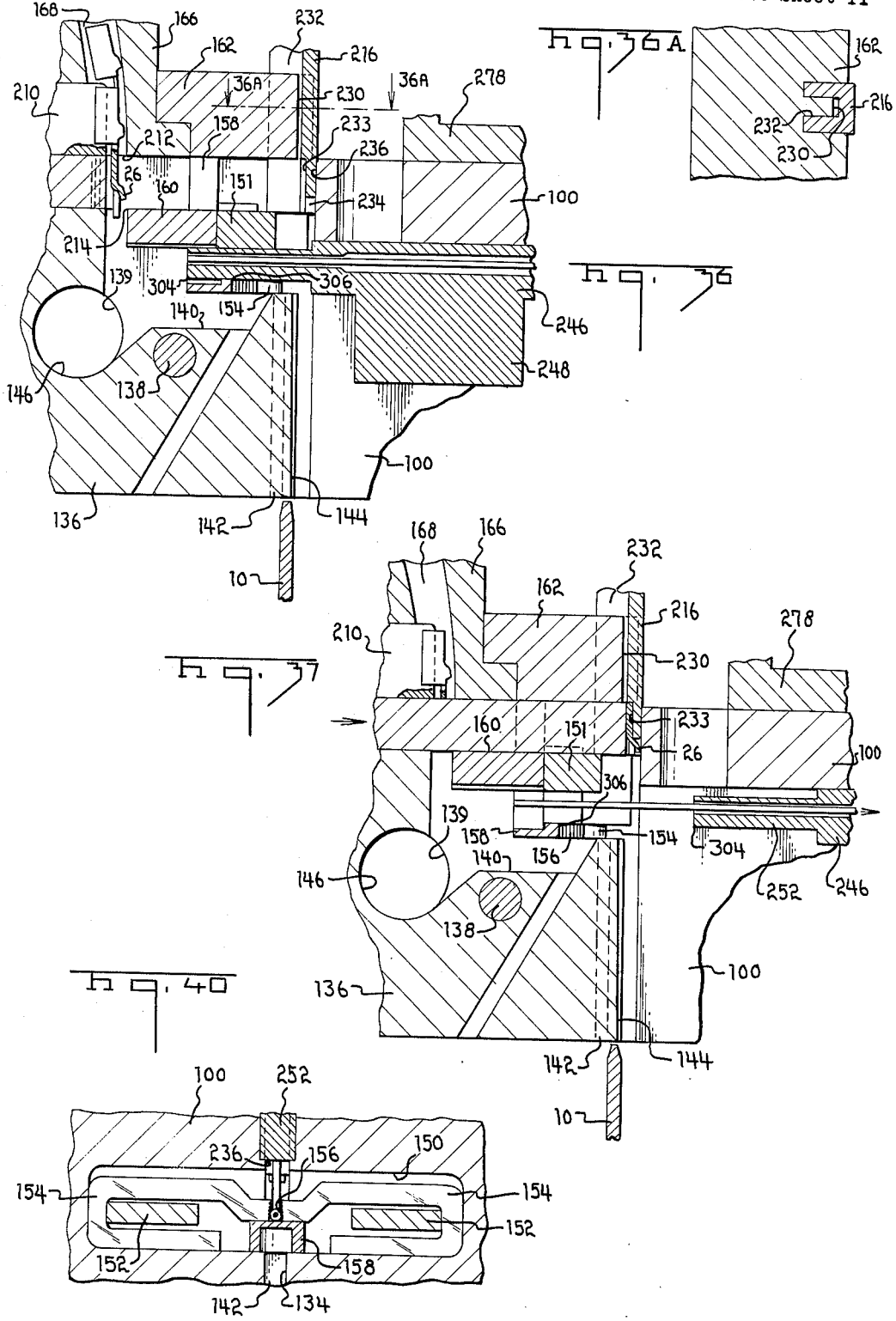

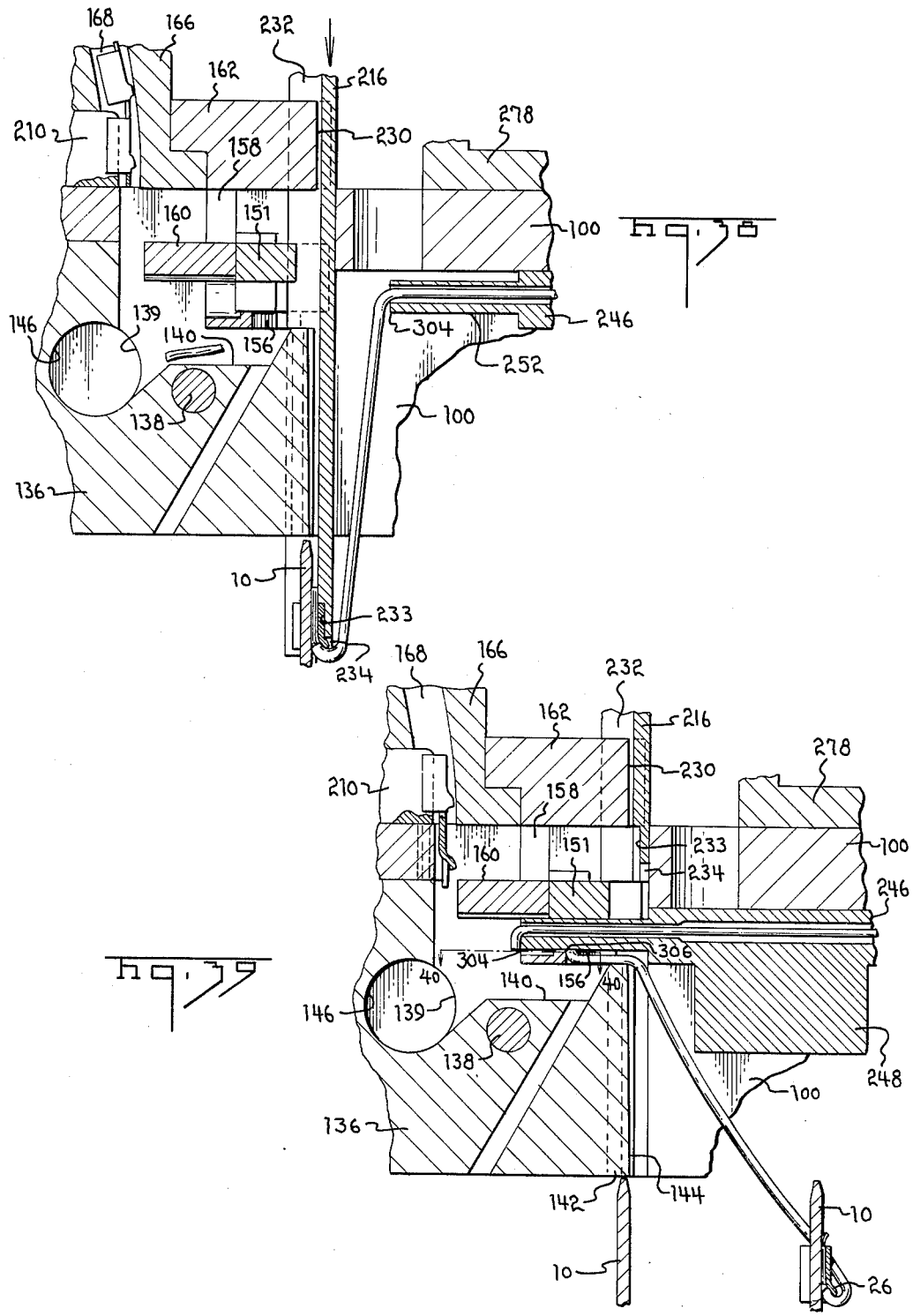

United States Patent Office 3,239,918
Patented Mar. 15, 1966

3,239,918
METHOD OF MAKING AN ELECTRICAL CONNECTION
Robert F. Cobaugh, Hershey, Pa., assignor to AMP Incorporated, Harrisburg, Pa.
Filed Feb. 5, 1962, Ser. No. 171,074
6 Claims. (Cl. 29—155.55)

This invention relates to electrical connectors, and to methods and apparatus for forming an electrical connection between a wire and a prism shaped post or tab.

A presently used and widely accepted wiring technique for electrical equipment is to provide terminal posts or tabs on the equipment or on a junction panel and to electrically connect these tabs or posts with each other by means of wires having connectors on their ends. For example, an electrical appliance such as a washing machine will have terminal tabs or posts on its switches, motor, solenoids and other components. The wires for connecting these posts will have connectors on their ends which mate with the posts so that the wiring operation merely involves applying the connectors to the posts. Advantageously, the connectors should be of the type that can be removed and reapplied to the posts to permit servicing operations and the operation of applying or removing the connectors should be one which can be accomplished easily and in a short time. Usually, the wires used are insulated with either a tubular sheath of vinyl, polytetrafluoroethylene or the like, or with a hard thin coating of a varnish type insulation such as trifluorochloroethylene.

In common manufacturing practice the lead wires are prepared in an operation separate from the actual wiring operation; that is, the lead wire is cut, its ends are stripped, and terminals are applied, and then the finished lead is taken to the electrical device which is to be wired and the terminals placed on the posts. Quite often, the leads are manufactured at a location remote from the actual wiring operation since the manufacture of leads is a relatively specialized operation which ordinarily is not directly combined with the wiring operation.

A desideratum in the wiring art has been the provision of a wiring technique which would eliminate the entire lead manufacturing operation so that the leads might be formed at the time the electrical device is wired. One requirement of a wiring operation of this type would be that none of the advantages of using disengageable electrical connectors for the terminal posts or tabs should be lost. Thus, the ideal wiring technique would involve stripping of the wires in the case of insulated wires, application of connectors to the wire ends and to the posts and would be capable of being accomplished in about the same amount of time as is now required to apply a previously prepared lead to a terminal post.

An object of the present invention is to provide an improved wiring technique which obviates the requirement of using previously prepared leads. A further object is to provide a wiring technique in which an electrical connector is secured to the end of a wire and assembled to a terminal post or tab in a single operation. A further object is to provide a wiring technique suitable for both insulated and uninsulated wires which dispenses with the necessity of a separate wire stripping operation and/or a wire cleaning operation. A further object is to provide an electrical connector for forming an electrical connection between an insulated wire and a terminal post which strips the insulation from the wire when it is applied to the post. A still further object is to provide apparatus for applying electrical connectors in accordance with the invention to terminal posts. A further object is to provide a method and apparatus for electrically connecting two different terminal posts or tabs in which the lead wire connecting the posts is manufactured simultaneously with the making of the electrical connnections to the post. A still further object is to provide a direct electrical connection between a terminal and a wire.

These and other objects of my invention are achieved in a preferred embodiment in which I use a generally channel-shaped connector having a web and upstanding sidewalls on opposite sides of the web. The longitudinal marginal portions of the sidewalls are inwardly turned towards each other and towards the web so that the connector can be slid over and onto a terminal post and will remain on the post in embracing relationship therewith. At one end, the web has an insulation support for the insulation of the wire which comprises an outwardly deformed portion on the surface of the web, this outwardly deformed portion extending in the opposite direction from the web sidewalls. In the practice of the invention, the wire is positioned with its axis extending across the post and normally of the axis thereof and the connector is aligned with the post for movement onto the post. As the connector is moved past the insulated wire and onto the terminal post, the insulation of the wire is punctured or cut so that upon further movement of the connector, the insulation is circumferentially torn and stripped from the wire. Thereafter as the connector moves onto the post, it drags or pulls the end of the insulating core of the wire from the end portion of the insulation so that when the connector comes to rest on the post, it holds the stripped ends of the wire against the surface of the post.

The stripping of the insulation from the end of the wire can be facilitated by means of an anvil which is aligned with the post and which has a notch for reception of the insulating core of the wire. On each side of the notch the anvil has edges which cut into the insulation so that as the clip moves over the anvil, the conducting core is pulled into the notch while the insulation is held and torn after initial cutting at these cutting edges. The anvil can be formed on the post itself if desired or can be provided in a specialized tool by means of which the connectors are applied to the posts. It should be added that while the invention includes the removal of insulation from an insulated wire, the principles of the invention are also applicable to uninsulated wire as is explained more fully below.

In the drawing:

FIGURE 1 is a perspective view showing two electrical connectors in accordance with the invention in end to end strip form.

FIGURE 2 is a sectional view taken along the lines 2—2 of FIGURE 1.

FIGURE 3 is a side view of the embodiment of FIGURE 1 taken along the lines 3—3 of FIGURE 2.

FIGURES 4, 5 and 6 are fragmentary views illustrating the progressive steps in the application of the type of clip shown in FIGURE 1 to a terminal post or tab and illustrating the stripping of the conductor during such application.

FIGURE 7 is an exploded fragmentary view showing a terminal post, an anvil in accordance with the invention, a connector, and the end portion of a tool for applying the connector to a post.

FIGURE 8 is a view showing a connector of the type shown in FIGURE 1 on the end of a conductor after it has been removed from a terminal post.

FIGURE 8A is a cross sectional view showing the connector of FIGURE 1 on a post.

FIGURE 9 is a perspective view of an alternative form of connector.

FIGURE 10 is a sectional side view of the connector of FIGURE 9.

FIGURE 11 is an end view taken along the lines 11—11 of FIGURE 10.

FIGURE 12 is a perspective of a terminal post having an integral anvil on its end.

FIGURES 13 and 14 are side views illustrating the method of the invention as practiced with the connector of FIGURE 9 and the terminal post of FIGURE 12.

FIGURES 15 and 16 are sectional side views showing the method of the invention as practiced with a conventional terminal post and the connector of FIGURE 9.

FIGURE 15A is a profile view of a wire which has been connected to a post with a connector of the type shown in FIGURE 9.

FIGURE 17 is a sectional side view showing a hand tool for applying connectors of the type shown in FIGURE 1 to terminal posts in accordance with the invention.

FIGURE 17A is a view taken along the lines 17A—17A of FIGURE 17.

FIGURE 17B is a view similar to FIGURE 17A but showing the nose of the tool positioned against a terminal post and illustrating the manner in which the connector becomes attached to the wire.

FIGURE 17C is a view taken along the lines 17C—17C of FIGURE 17.

FIGURES 18 and 19 are views taken along the lines 18—18 and 19—19 of FIGURE 17.

FIGURES 20, 21, 22 and 23 are fragmentary sectional views showing the nose portion of the tool of FIGURE 17 and illustrating its operation.

FIGURE 24 is a perspective fragmentary view showing the plunger and anvil of the tool of FIGURE 17.

FIGURE 25 is a view taken along the lines 25—25 of FIGURE 23.

FIGURE 26 is a perspective view showing a terminal of the type shown in FIGURE 1 on the end of a terminal post.

Figure 27:
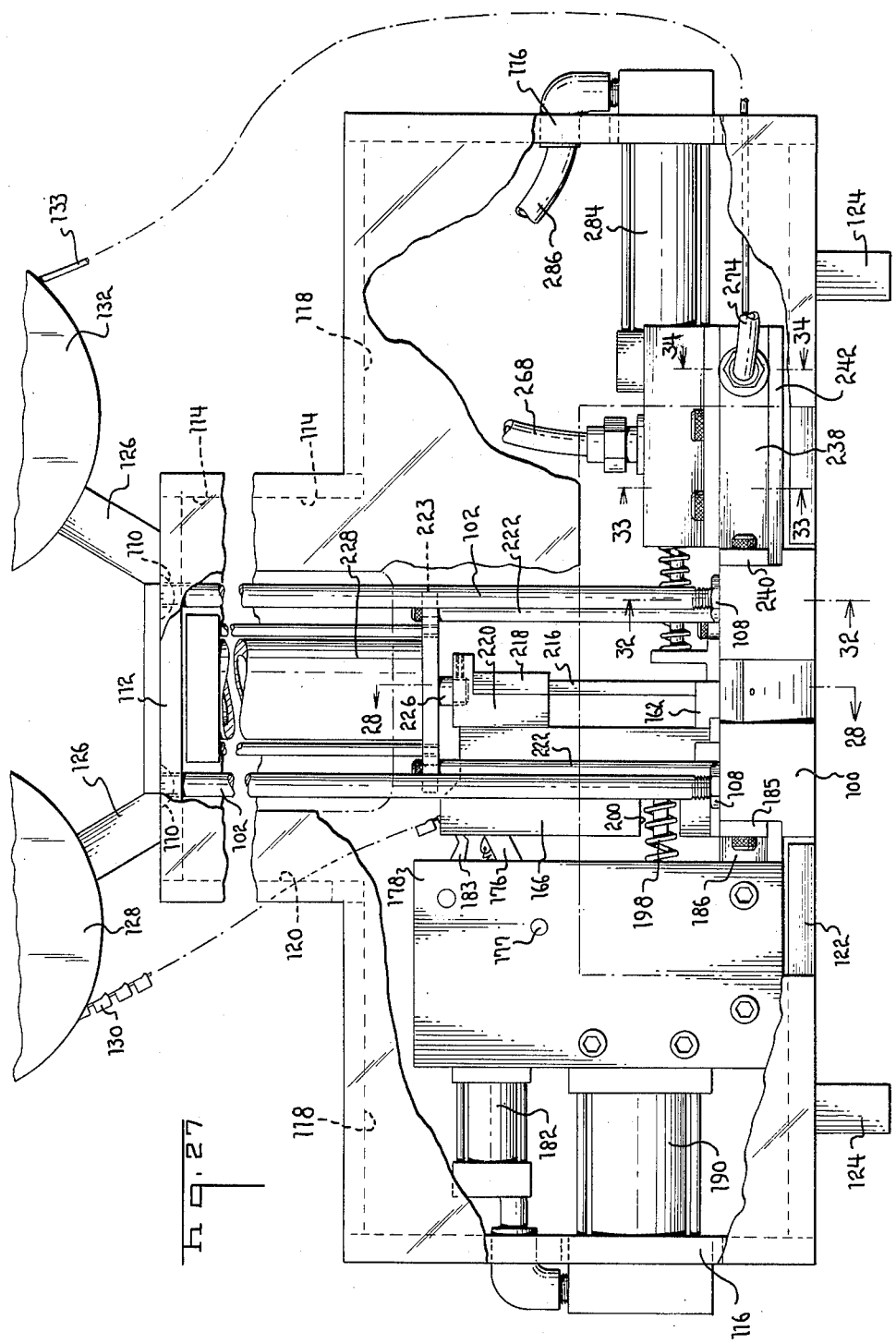

FIGURE 27 is a frontal view with parts broken away of an alternative apparatus for applying connectors to terminal posts in accordance with the invention, this apparatus being adapted to apply connectors of the type shown in FIGURE 9.

FIGURE 28 is a sectional view taken along the lines 28—28 of FIGURE 27.

FIGURE 29 is a view taken along the lines 29—29 of FIGURE 28.

FIGURE 30 is a fragmentary perspective view showing the post stabilizing means provided on the embodiment of FIGURE 27.

FIGURE 31 is a sectional view taken along the lines 31—31 of FIGURE 28 showing the details of the wire feed mechanism, the connector feed mechanism and the connector plunger of the embodiment of FIGURE 27.

FIGURES 32, 33 and 34 are views taken along the lines 32—32, 33—33, and 34—34 of FIGURE 27.

Figure 35:
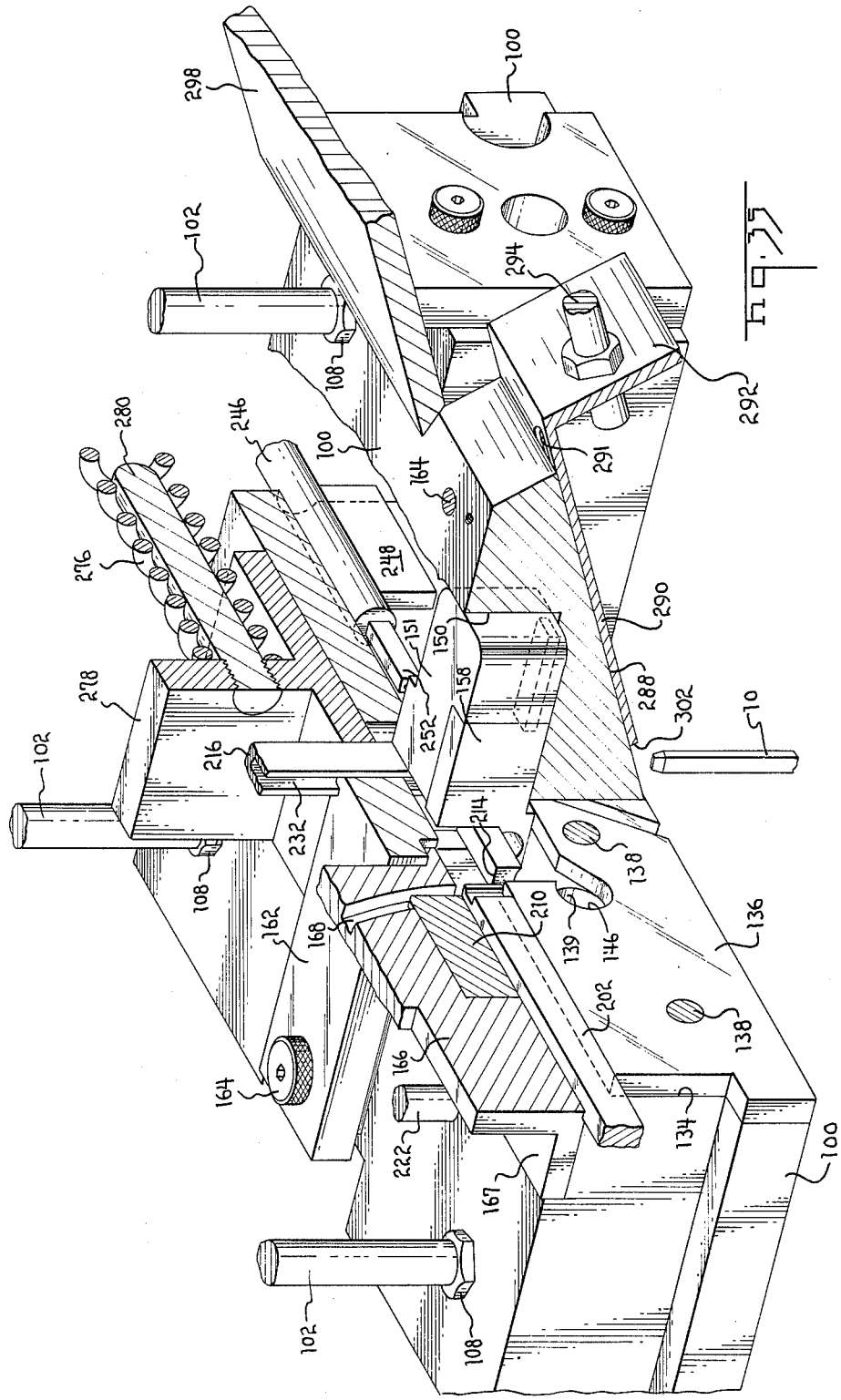

FIGURE 35 is a fragmentary perspective view with parts broken away showing some details of the connector feed and transfer mechanism, the wire feed mechanism and the connector plunger of the embodiment of FIGURE 27.

Figure 35A:
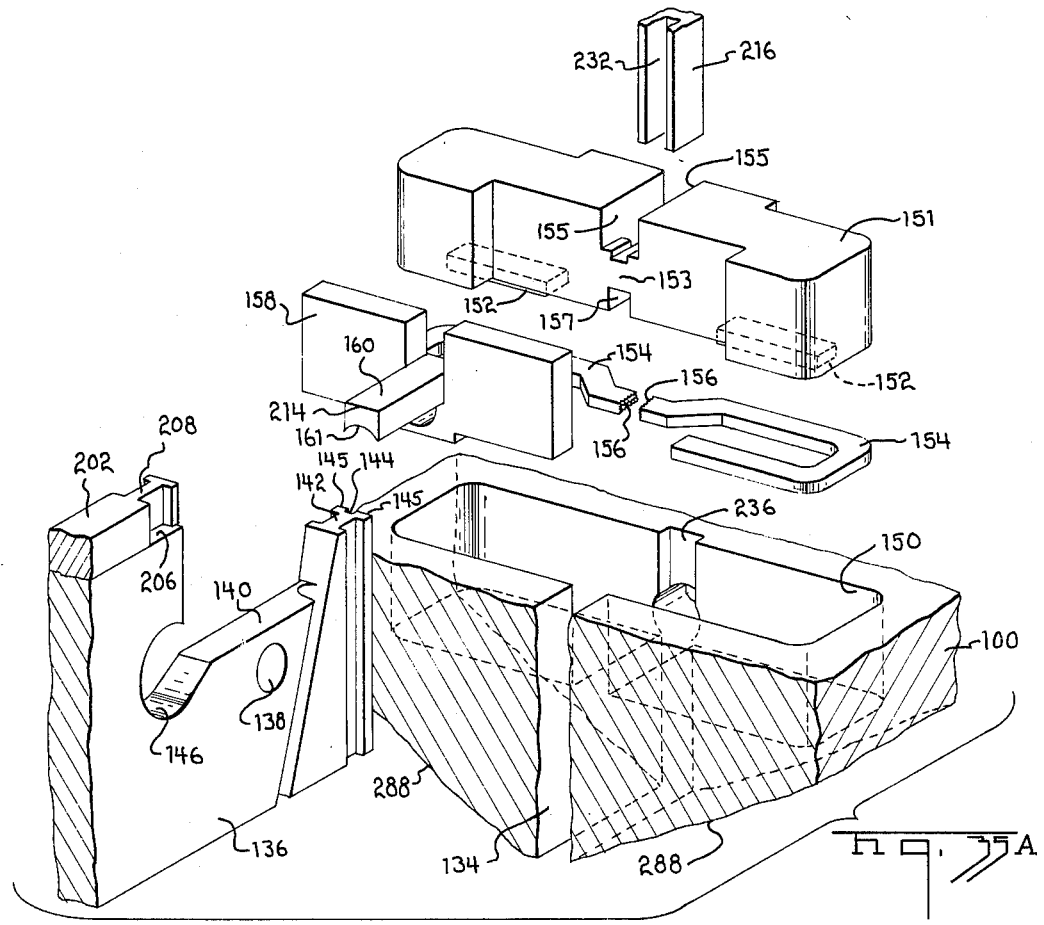

FIGURE 35A is an exploded perspective view showing some features of the anvil, the connector transfer mechanism and some associated structure.

FIGURES 36, 37, 38 and 39 are fragmentary sectional views illustrating the application of connectors to posts by the embodiment of FIGURE 27 and particularly illustrating the manner in which different posts are electrically connected and the lead wires connecting the posts are simultaneously formed.

FIGURE 36A is a view taken along the lines 36A—36A of FIGURE 36.

FIGURE 40 is a view taken along the lines 40—40 of FIGURE 39.

FIGURES 1–7 show a preferred connector in accordance with the invention and illustrate the method of forming a connection between a wire and a terminal tab member or terminal post 10. Terminal posts of this type are commonly used on many types of electrical devices such as electrical appliances, communications equipment, switches, etc. and are usually used with disengageable electrical connectors crimped or otherwise secured to the ends of wires.

This embodiment of the connector or connecting member comprises a substantially flat web 1 having sidewalls 2 extending along the longitudinal edges thereof, these sidewalls being inwardly curved as at 3 towards each other and towards the web. The connector thus has an open seam extending axially along the side opposite to the web. A central portion of the web is inwardly displaced towards the edges of the sidewalls to provide a substantially flat surface 4 which is opposed to the faces or edges 9 of the sidewalls. The web extends beyond the ends of the sidewalls 2 and a pair of tabs 6 are struck up on the opposite side of the web from the sidewalls from this end portion of the web, these tabs forming an insulation support for a wire as is described below. The edge of the web 8 adjacent to the tabs 6 is rounded (i.e. provided with a radius) as shown in FIGURE 3 to avoid damage to the wire strands when an electrical connection is made. Advantageously the connector of FIGURE 1 is manufactured in end to end strip form with the rearward end of each connector integral with the forward end of the next adjacent connector as indicated at 5a. When one connector is separated from a strip, it is sheared in a manner which leaves a forwardly extending tab 7 on the web and a complementary recess 7a on the rearward portion 5 of the web, this recess being located centrally of the web in alignment with the struck-up tabs 6.

The connector of FIGURE 1 is applied to a terminal post 10 by means of a mandrel or anvil and plunger illustrated in FIGURES 4–7. Ordinarily this anvil and plunger, or their functional equivalents, will be integrated in a hand tool or a machine as disclosed below. The fragmentary views of the applicator tooling are shown in FIGURES 4–7 for the purpose of presenting a simplified and brief description of the method of the invention.

The anvil block or mandrel 12 has a T-shaped extension comprising a rib portion 13 and a cross member or head 14. The cross member 14 which has a width which is slightly less than the inside width (the distance between the sidewalls) of the connector and has a thickness which is substantially equal to the post thickness. The mandrel 13, 14 thus generally conforms to the internal cross section of the connector in the sense that it functions as a guide means which is adapted to support the connector during movement of the connector thereover although the mandrel cross section need not conform precisely to the internal cross section of the connector. The edge 16 of this cross member is preferably somewhat sharp and has a centrally located notch 15 of a width greater than the diameter of the conducting core 22 of the wire and less than the diameter of the insulation of the wire which is to be applied to the post. On its underside, the cross member 14 has a recess to receive the swaged end 11 of the post 10 in order to permit the parts to be held in alignment with each other. A plunger 17 for pushing the connector onto the post is of channel-shaped cross section and has an enlarged recess 18 at its lower end which is adapted to receive the connector as shown in FIGURE 7. The opposed sidewalls of this recess 18 are preferably spaced apart by a distance substantially equal to the spacing between the external surfaces of the sidewalls 2 of the connector. The groove 19 of the plunger 17 is of a width such as to permit it to receive and pass over the T-shaped extension 13 and a recess 20 is provided at the lower end of this groove to receive the tab 7 of the connector.

In use, the insulated wire is positioned with its axis extending across the upper surface of the block 12 and with the conducting core thereof in alignment with the notch 15. A connector is placed in the recess 18 of plunger 17 and the anvil is located against the end of the post 10 as shown in FIGURE 5. The connector is then pushed downwardly by means of the plunger (FIGURES 4, 5 and 6) across the anvil past the upper or free end of the anvil and onto the post towards the lower or fixed end of the post. It will be apparent that the orientation of the wire in FIGURE 4 is such that its axis extends through the path of movement of the connector onto the post and, particularly, through the side of the path along which the open seam travels and through the side along which the opposite side (i.e. the web) of the connector travels. As the connector moves downwardly from its initial position, the lower or leading end of the connector moves against the wire and forms a bight (i.e. a bend or curve) in the wire and drags the wire downwardly as viewed in FIGURES 4-6. During this interval, the insulation of the wire is pinched between the sides of the recess 7a so that relative movement of the connector with respect to the wire is prevented or at least severely restricted. Upon further downward movement of the connector, the insulation on the wire at a point slightly above the recess 7a is pressed against the edges 16 of the anvil so that it is cut or punctured. The insulation then is circumferentially torn, as the connector continues its downward movement, by virtue of the fact that it is gripped in the recess 7a and in the recess formed by the struck-up tabs 6 and pulled downwardly from the zone of puncture. The severed tubular section of insulation 21a remains on top of the anvil and the core 22 is pulled downwardly into the notch 15 and withdrawn from the severed section. The curved surface 8 on web 4 adjacent to the tabs 6 and the notch 15 permit the wire core 22 to be withdrawn from the insulation and compressed between the web and the anvil without damage. In other words, the conducting core is drawn between smooth curved surfaces and is not compressed between sharp edges.

In the finished connection which is formed after the connector has moved onto the post, the strands of the wire 22 are pressed against the surface of the tab and the end portion of the insulation is locked by the L-shaped extensions of the web and within the insulation support tabs 6 of the web as shown in FIGURE 23. The wire is thus firmly pressed against the surface of the post by the connector and particularly by the sidewalls 2 which pivot about their base portions and press the surface of the web and the opposed surface of the post towards each other with the conducting core of the wire held therebetween.

The dimensions of the post relative to the dimensions of the connector are not highly critical, however, for best results certain limitations should be observed with the embodiment of FIGURE 1 as with other embodiments of the invention. For example, the dimensions of the clip and post must be such that the smallest size wire contemplated in use will be firmly forced against the post. Larger wires will then also be usable with the same clip-post combination. The width of the post is advantageously less than the distance between the opposed sidewalls as shown in FIGURE 8A in order to avoid jamming of the connector in the event that it should be slightly askew with respect to the post during application. The inwardly displaced section of the web contributes to the avoidance of jamming since the edges of the post are kept out of contact with the connector sidewalls. Alternative embodiments of the invention need not necessarily conform to the above criteria and it may be found that some of these recommended limitations are unnecessary.

The connector itself is deformed to some extent when it is applied to the post by the wedging effect of the wire and the amount of deformation will depend upon the size of the wire. It is preferable that this deformation should be concentrated in the web 1 rather than in the sidewalls so that the sidewalls will not be bent outwardly and will be able to perform their spring function of firmly holding the wire against the post. It is for this reason that the sidewalls 2 are supported against substantial outward movement by the sides of the recess during application. The sides of this recess, as noted above, are spaced apart by a distance substantially equal to the spacing between the external surfaces of the sidewalls and the sidewalls cannot, therefore, be bent or set outwardly during application. The web yields during application either plastically or elastically depending on the wire size, by the formation of an axially extending channel as is shown in FIGURE 26.

A salient feature of the invention as described thus far is that the manufacturing step of stripping the wire and placing a terminal on its end is combined with the assemblying step of placing the electrical connector on the terminal post. Moreover, the actual manipulative step involved is merely one of essentially sliding the connector onto the post as was common with prior art disconnect type devices. The wire is secured to the connector while the connector is being applied to the post by virtue of the gripping effect of the L-shaped extensions 5 of the web and the insulation support tabs 6 struck therefrom. The end portion of the insulation becomes wedged between these extensions and within the recess formed by the tabs 6 so that if the connector is removed from the post 10 at a later time for service or repair (FIGURE 8), the elongated and drawn out wire strands 22 remain adjacent to the web and the connector itself remains secured to the end of the wire. In effect then, if an electrical connection is made between two posts by means of connectors in accordance with the invention, a lead for connecting these two posts is manufactured at the time the connections are made and this lead can later be removed intact with its connectors on its ends.

The quality of the electrical connections formed has been found to be very good. It will be apparent that the metallic core of the wire is firmly held directly against the post and that the connector itself does not need to perform a current carrying function. Furthermore, the direct association of the wire core with the post avoids the need for a separate crimped or soldered connection as with many disengageable connectors of the prior art. It should be added that since the core is pressed against the anvil surface and later against the post during application, the surface of the conducting core is vigorously abraded and cleaned, a factor which would further contribute to the achievement of good electrical conducting properties.

A further advantage of the invention is that, if desired, a substantial range of wire and insulation sizes can be accommodated by a single size of connector and post. The conducting core of the wire is merely pressed against the post by the clip itself and the web and sidewalls will adapt themselves to a range of conductor sizes; thus for a relatively large diameter conductor, the web of the connector is deformed during application to a higher degree than is the case for a smaller conductor but the overall effect is the same for both conductors. A fairly wide range of insulation diameters can likewise be accommodated by a given size of connector since ordinary plastic insulations are relatively compressible and flowable under load. Thus, when the connector is applied and the insulation adjacent to the cut face is compressed by the tabs 6 and between the extensions 5, it will be locked in these areas. Obviously, the diameter of the insulation should be sufficiently large that it will, in fact, be compressed in the insulation support when it is forced into this support as shown in FIGURE 5.

Since connectors in accordance with the invention do not perform a current carrying function, they need not be of a highly conductive metal. Thus, they can be formed from strip steel or other suitable high strength metal which has sufficient mechanical properties to permit the sidewalls to perform their holding function. Steel connectors where used may be plated to enhance their corrosion resistance. Alternatively, connectors in accordance with the invention can be made from high strength plastic materials or other non-conductors.

FIGURE 9 shows an alternative embodiment of a connector in accordance with the invention particularly adapted for relatively small wires, e.g. AWG 24 and smaller. This connector has a substantially flat web 23 and sidewalls 24 extending the full length thereof. These sidewalls are inwardly turned as shown at 25 towards the web and the open seam is provided between these sidewalls. In this particular embodiment, the sidewalls are not curled as with the previous embodiment by reason of the difficulty of forming curved sections by stamping and forming operations on extremely small parts. The web is notched as shown at 27 at one end and has a cupped or drawn up insulation support 26, the inside surface of which tapers toward the plane of the web as shown at 26a in FIGURE 10. A plurality of inwardly displaced sections 28 are provided in the web to form corrugations which enhance the effect of the contact pressure applied to the wire by the connector.

In general, the method of forming an electrical connection with the embodiment of FIGURE 9 is substantially the same as with the embodiment of FIGURE 1 although some minor differences should be noted. In FIGURE 9, the wire is smaller, relative to the size of the connector and post, than in FIGURE 1. When the wire is compressed between the connector web and post therefore, the deformation of the connector is not nearly so apparent as is the case with the previous embodiment. Furthermore, since the deformation is less, it can be taken up for the most part in the sidewalls rather than in the web as in the FIGURE 1 embodiment. The actual manner in which the connector is deformed (whether by web deformation or by the sidewalls) will thus depend upon the precise conditions of use such as wire size, connector size, the relative hardness of the wire and connector, and other factors. This connector, FIGURE 9, may be used in combination with an anvil similar to that of FIGURE 7 and a plunger adapted to push the connector downwardly over the anvil and onto a post.

As an alternative to the use of a separate anvil, the post itself may be formed in a manner such as to provide an anvil on its end as shown in FIGURE 12. Thus, the post 29 has a tongue 30 struck from its end portion and bent out of the plane of the post so that cutting edges 31 are provided on each side of the notch formed by the tongue. In accordance with this embodiment the insulated wire is merely positioned with its axis extending across the top of the post and with its insulating core in alignment with the tongue 30. The connector is then pushed downwardly onto the post, FIGURES 13 and 14, so that the edges 31 bite into the insulation and the wire core is dragged down over the surface of the tongue and compressed between the web 23 of the connector and the surface of the post.

Under some circumstances it is feasible to perform the insulation cutting on the end of a conventional terminal post as is shown in FIGURES 15 and 16. The post in these figures has a swaged and slightly tapered end. The wire is positioned with its axis extending across the top of the post and transversely of the plane thereof and the connector is moved relatively downwardly onto the post. In accordance with this embodiment, the constricted end portion of the insulation support surface adjacent to the inside surface of the web 23 presses the insulation against the tapered and swaged end of the post so that the edge of the post penetrates the insulation. Upon further downward movement of the connector, the insulation is circumferentially torn and the core of the wire is pulled downwardly and pressed against the post by the connector as previously described. In this, as in other embodiments, the severed section of insulation is left at the top of the post or at the top of the anvil in the previous embodiment, by virtue of the fact that the connector is of substantially channel-shaped cross section so that a gap remains on the one side which permits movement of the connector past the severed section of insulation.

The embodiments of the invention described above require initial severing of the insulation in a localized area by the edges of the anvil or the terminal post coupled with subsequent tearing or other separation of the end section of insulation from the main body of the wire. Some types of insulation are more resistant to tearing in this manner than are others; for example, conventional vinyl insulations have a relatively high notch sensitivity which is to say that once cut in a localized area the cut will tend to spread and the insulation will be torn upon application of a stress at the root of the cut. Insulations which tear easily in this manner can be stripped in accordance with the embodiment of FIGURES 15 and 16 as well as with the embodiments requiring a notched post or anvil. Other types of insulation, particularly Teflon (polytetrafluoroethylene) are highly resistant to tearing and possess low notch sensitivity. With these insulations it is sometimes essential to use a notch post or anvil for best results. It should be mentioned also that under some circumstances it is possible to avoid stripping the wire in accordance with the invention. For example, it has been found that if the wire is merely positioned across the top of a conventional post and the clip is moved down over the post, the insulation will sometimes be severely compressed and flow from between the wire and the surface of the post so that the core is finally ironed against the surface of the post while the insulation remains on each side of the core and between the connector and the post. The achievement of this result requires flowable insulation such as Teflon and a high unit pressure on the wire during the movement of the connector onto the post.

The forming of electrical connections in accordance with the invention is also practical with uninsulated wires and with wires having varnish type insulations available under the trademarks Kel–F (trifluorochloromethylene) or Formvar (polyvinyl formal resins). In the case of the varnish type insulations, the insulation can be removed when the wire is pulled over the anvil and post. In the case of uninsulated wires, a beneficial cleaning effect is achieved by the movement of the wire. The wire can, in these circumstances be pinched and gripped with a notch in the web as shown at 7a in FIGURE 1.

During application of the clip to the post it is advantageous to impose a relatively high stress upon the conducting core of the wire which should be in excess of the elastic limit of the wire. The stress imposed upon the wire can be controlled by means of the thickness of the cross member 14 of the anvil relative to the size of the clip, i.e. the thicker this member, the higher the stress imposed by the web of the clip as it moves downwardly over the anvil. The reason for imposing a high stress is that the wire is thereby deformed and elongated or ironed against the anvil and clean metal surface is exposed. As shown in FIGURE 15A, the diameter of the wire is reduced in the zone in which it is elongated and deformed, this zone being in the vicinity of the inwardly displaced sections 28 of the connector. In the embodiment of FIGURE 9, these inwardly displaced sections have the effect of raising the unit stress on the wire resulting in the elongation shown. Elongation of the wire can be effected without these inwardly displaced sections as is the case with the embodiment of FIGURE 1. The clean surface produced by ironing and elongation of the wire yields a connection of lower electrical resistance with the post than is obtained if the wire is not deformed during application. The depth of the groove or notch 15 plays an important role in the magnitude of the stress on the wire, a relatively shallow groove resulting in a higher unit stress than a relatively deep groove for a given wire.

It is not intended to imply that deformation of the wire and elongation as described above is essential to the practice of the invention insofar as the stripping of the wire and the application of the clip to the post is concerned. Under some circumstances it may be desirable to avoid elongation of the wire and merely hold it against the post by the resilience of the clip.

The force required to apply the clip to the post is relatively higher during the interval when the insulation is being stripped and the wire flattened than the force required at the end of the stroke. For this reason, a power assisted tool or apparatus is preferable under many circumstances as described below. It should be added that if the clip and wire are removed from the post after initial application, the force required for reapplication is low so that manual removal and reapplication is practical.

Alternative forms of posts and clips are contemplated. In general, the post can take any prism shaped form so long as the clip conforms to the post in a manner such as to accomplish the stripping and/or compressing of the wire during application.

FIGURES 17–26 show a preferred form of hand tool for making electrical connections in accordance with the invention using the connector of FIGURE 1. This embodiment comprises a tool body formed in three sections, 33, 35 and 37, the section 33 having a laterally extending handle 32. The intermediate section 35 has a longitudinally extending channel 36 therein and the lower section 33 has an upstanding rib 34 which extends centrally along this channel. The three sections of the body are held together by means of screws 38 which extend through the top section, through the arms 39 of a spring member described below and through the intermediate section 35 and into the base section 33. The nose portion of section 33 has a recess 40 in which there is mounted a block 41 (FIGURE 24) held in place by means of a fastener 42. This block has a centrally located rib 43 on its upper surface which is in alignment with the previously described rib 34 of the lower body section. A cylindrical opening 44 extends through the block 41 and transversely of the tool axis at the end of the rib 43 and the extreme end of the block has a support member 46 integral therewith and extending from the opposite side of the opening 44 from the rib 43.

An anvil plate 48 is mounted on the upper surface of the support member 46 and has a recess or notch 50 on its side which is adjacent to the opening 44. Anvil 48 should have a width which is substantially equal to the inside width of the connector and a thickness which is slightly less than the thickness of the terminal post or tab. The notch 50 tapers towards the opening 44 and is of a width which is slightly greater than the diameter of the conducting core 22 of the wire and less than the diameter of the wire insulation. The edges 52 of the anvil on each side of the notch 50 are preferably relatively sharp so that these edges can function to cut into the insulation of the wire in a manner described above.

The spring 39 which is interposed between the body section 37 and the body section 35 of the tool has a pair of arms 39 (FIGURE 18) which extend along the upper surface of the section 35 and has a downwardly directed U-shaped end section 53 which extends over anvil 48. A guide notch 54 (FIGURE 17) which is of a width substantially equal to the width of the terminal post 10 is provided on the under side of this end 53 of the spring to center the end of the post with respect to guide block 46 and anvil 48 during use.

The upper surface of intermediate body section 35 has an opening 56 adjacent to the end of the rib 43 and the laterally extending opening 44 in block 41. Opening 56 is of a length sufficient to admit the connector as indicated in FIGURE 1 so that the connector can be positioned over the end of rib 43 of block 41 with its sides in straddling relationship thereto. A slot 57 extends from opening 56 to the end of intermediate body section 35 and past opening 44, see FIGURE 17A. As shown at 45 (FIGURE 17C), the roof of the channel 36 is somewhat lower in the vicinity of this slot than the portion of the channel which extends leftwardly from opening 56. This configuration in the channel has the effect of localizing the deformation in the web of the connector as is described more fully below.

A U-shaped plunger 62 is slidably mounted on ribs 34, 43 and in the channel 36 and has the end portion of its web cut away as shown at 64 to accommodate the projecting tab of the connector. This plunger extends rearwardly of the tool and into a central bore 69 in body sections 33 and 37 at which point it is connected at 66 to a piston rod 68 extending from a piston 70. This piston is reciprocable within a cylinder 76 having cylinder heads 67, 74 secured to the tool body by means of bolts 78. Piston 70 is normally biased leftwardly as viewed in FIGURE 17 by means of a spring 72 and is driven rightwardly by compressed air supplied through an air hose 80 from a suitable source. Advantageously, the valve (not shown) for actuating the tool is controlled by a pivoted trigger 82 in handle 32 which depresses the plunger 84 of a switch 86 mounted in the handle.

In use, a connector is inserted through the opening 56 as indicated in FIGURE 17 with the projecting tab extending toward the rear of the tool and the recess 64 of the plunger 62. The connector will then be straddling the rib 43 of block 41 and will be in a position to be pushed rightwardly upon movement of plunger 62. Thereafter the tool is aligned with the tab or post and moved relatively toward the post until its end is within the notch 54 on the underside of spring end 53. The end of the post will then be centrally located against the edge of anvil 48 and the upper surface of support 46. The wire is then inserted as indicated in FIGURE 20 through the opening 44 until a sufficient length projects past the notch 50 in the anvil. The trigger 82 is then depressed to drive the plunger rightwardly to strip the wire and form the electrical connection as illustrated in FIGURES 20–23.

The movement of the connector onto the post with concomitant stripping of the insulation from the wire takes place in essentially the same manner as was described above with reference to FIGURES 4–6 although there are certain minor differences noted below. Thus, the notch 7a in the end of the connector is first forced against the wire and pinches it and the insulation is pressed against the edges 52 of the anvil. The insulation is punctured and tears and the conducting core of the wire is drawn from the severed insulation, through the notch 50, over the anvil and downwardly against the terminal post. The wire adjacent to the connector passes through slot 57 during movement of the connector and the insulation adjacent to struck-up tabs 6 is compressed in the concavity formed by these tabs.

In the embodiment of FIGURE 17, the connector is confined, during its movement past anvil 48 by the sides of channel 36 and by the top or roof 45 of the channel. The web of the connector is left unconfined only in the axial central zone of the slot 57 so that the deformation which takes place is localized in the central zone. In this manner, the wire strands are prevented from being widely spread during application. This feature is not present in the applicator tooling shown in FIGURES 4–6 although it can be incorporated in that tooling by providing a recess in the back wall of the lower end of the applicator 17 in FIGURE 7.

An alternative connector applying apparatus in accordance with the invention shown in FIGURES 27–40 operates on the same general principles as the tool of FIGURE 17. This embodiment is particularly adapted to apply the connector of FIGURE 9 and includes connector feeding and wire feeding means and is particularly intended for wiring panels having a large number of terminal posts mounted thereon.

Referring to FIGURES 27, 28, 31 and 32, the various sub-assemblies of this embodiment including connector feeding and transferring means, wire feeding means, and clip applying means, are mounted on and around a main frame block 100 which is suspended in a frame housing by means of rods 102. These rods extend through openings 104 in the block (FIGURE 32) and have hemispherical nuts 106 on their ends which are received within counterbores in the openings 104 having hemispherical surfaces to permit limited swinging motion of the frame block. Advantageously, stop nuts 108 are also threaded on the lower ends of the rods 102 above the surface of the frame block. The upper ends of the rods 102 extend through openings in a top frame plate 112 and have hemispherical nuts 110 thereon which are received within complementary hemispherical recesses in the top plate. The frame housing comprises the top plate 112, T-shaped side plates 114, end plates 116, 118, 120, and a bottom plate 122 which has a central opening for the main frame block 100, this opening being sufficiently large to permit limited swinging motion of the frame block. The frame housing is supported by means of legs 124 secured to bottom plate 122. The purpose of suspending the main frame block within the frame housing by means of the rods 102 and the hemispherical nuts is to permit limited universal motion for alignment purposes as is described more fully below.

Connectors in strip form 130 are supplied to the apparatus from a reel 128 mounted on a bracket 126 which extends from top frame housing plate 112. Insulated conductor wire 133 is supplied to the opposite side of the apparatus from the connectors 130 from a reel 132 mounted on a similar bracket 126. In each cycle of operation, wire is fed towards the main frame block, a connector is also fed towards this block, and the connector is applied to the post with concomitant stripping of the wire as with the previous embodiments.

The main frame block has a relatively narrow slot 134 extending inwardly from the lefthand side thereof as viewed in FIGURE 35A in which there is mounted a plate 136 by means of fasteners 138 (FIGURES 35 and 35A). The corner of this plate which is disposed in the central section of the frame block is cut away as indicated at 140 and the adjacent vertical edge has a T-shaped anvil extension substantially similar to the previously described anvil of FIGURE 7. Thus the anvil 142 has on its cross arm a centrally located groove 144 of a width slightly greater than the diameter of the conducting core of the wire and less than the diameter of the insulation of the wire. In this embodiment, the groove extends to the bottom of the anvil and its depth tapers slightly from top to bottom as is indicaed in FIGURE 36. The edge of the anvil 145 on each side of the groove 144 are preferably left somewhat sharp to permit cutting of the insulation as the wire is drawn downwardly relative to the anvil as with previous embodiments. It will be noted that plate 136 has a generally circular cavity 146 which is in alignment with a transverse bore 139 in frame block 100. This cavity and bore serve as a means for disposing of connecting slugs of the connector strip and insulation from the wire which are removed during operation, and to this end a compressed air stream is caused to flow through the bore during operation.

An elongated recess 150 is provided in the upper surface of the main frame block 100 and extends transversely of the slot 134. A block 151 which fits snugly into this recess comprises two substantially identical halves connected integrally by a neck portion 153 and has feet 152 on its lower side which support it above the bottom of the recess 150. Flat springs 154 (FIGURE 40) located in the bottom of recess 150 surround these leg or feet portions of the block 151 and have serrated ends 156 disposed on each side of the center line of slot 134.

A guide block 158 positioned within a channel in the face of block 151 is opposed to the plate 136 and has a central notch in alignment with the plate. A tongue extends towards the plate 136 from this notch and has an upper support surface 160 and an arcuate surface 161 on its under side. The blocks 151 and 158 are held in position in recess 150 by means of a clamping plate 162 which extends across their upper surfaces and is secured to the upper surface of the main frame block by means of fasteners 164.

The connector strip is fed through a strip feed block 166 composed of two identical halves and having a central arcuate passageway 168 which leads down toward the surface of the main frame block. This strip feed block is secured to the upper surface of the main frame block by means of flanges 167 (FIGURE 35) and has a recess or slot 170 on its lefthand side as viewed in FIGURE 31 communicating with passageway 168. The connector strip is fed by means of a feed finger 174 disposed in slot 170 and pivoted to the end of one arm 176 of a bell crank lever which, in turn, is pivotally mounted at 177 between a pair of plates 178. The other arm 179 of the bell crank lever has a pivotal connection with a block 180 threaded onto the end of a piston rod 181 of a pneumatic-piston cylinder 182 also mounted between the plates 178. It will be apparent that upon rightward movement of piston rod 181 as viewed in FIGURE 31, the feed finger 174 moves relatively downwardly towards the main frame block to advance the strip. This feed finger being maintained in resilient engagement with the strip by a spring 175. Advantageously, a slight frictional drag is applied to the connector strip by means of a lever 183 pivotally mounted between the plates 178 and resiliently biased in a counterclockwise direction by a spring 185.

The leading connector of the strip is laterally transferred by a transfer mechanism mounted in a generally U-shaped bracket. This bracket has side members 186 and flanges 185 which are secured to the main frame block on the lefthand side thereof as viewed in FIGURE 27 and has a web 187 extending between these side members. A panel 188 is mounted on the under side of this bracket and supported by a shoulder on the side of the main frame block and functions as a support surface for an L-shaped slide member 194 which is driven rightwardly by a piston rod 192 of a pneumatic piston cylinder 190 mounted between the plates 178, these plates being secured to the bracket on each side thereof. Slide member 194 is normally biased leftwardly in FIGURE 31 by a spring 198 which bears against the upstanding arm of the slide member and surrounds a pin extending from this arm. This spring on its other end is received within a recess 200 in the strip feed block 166.

A connector feed slide 202 is adjustably clamped to slide member 194 by a fastener 204 which extends through an over-sized slot in the feed slide. Advantageously, a set screw 205 is threaded into the slide member and extends through an opening in the web 187 of the bracket to permit changing of the limit of the stroke of the feed slide.

Feed slide 202 extends towards the center of the main frame block and is supported for reciprocation on the upper surface 206 of plate 136. At its inner end, this feed slide has a T-shaped extension 208 of about the same dimensions or slightly smaller than the T-shaped anvil 142. A guide insert 210 is provided in the block 166 at the lower end of the passageway 168 accurately to guide a connector strip to the transfer zone and into engagement with the T-shaped extension 208 on the end of the feed slide. The connector is fed over this T-shaped extension so that upon rightward movement of the slide as viewed in FIGURE 31, the connector is sheared from the strip and transferred to the vertically reciprocable plunger which is described immediately below.

The plunger 216 which moves the connector downwardly over the anvil and onto the terminal post 10 is secured by means of a clamping block 218 (FIGURE 29)

and fasteners 219 to a shoe 220. Shoe 220 is secured to the end of a piston rod 226 of a piston cylinder 228 which is supported on a plate 223, this plate being, in turn, supported by rods 222 threaded into the main frame block in surrounding relationship to the plunger. The piston of the piston cylinder 226 is normally biased upwardly by a spring 224 contained within the cylinder and is driven downwardly upon admission of compressed air into the upper cylinder end through a flexible air line as shown.

Plunger 216 is channel-shaped in cross section as shown at 232 and is guided during its vertical reciprocatory motion by means of a notch 230 in clamping plate 162 (FIGURE 36A) and by the opposed faces 155 of the two parts of the block 151 between which this plunger slides as indicated in FIGURE 35A. It will also be noted from this figure that a notch 236 is provided on the side of recess 150 to accommodate and assist in the guiding of the plunger during its downward movement.

The lower end of the plunger has an enlarged recess 233 and the web at the lower end is notched as shown at 234 to accommodate the insulation support portion 26 of the connector. The sides of the recess 233 are preferably spaced apart by a distance such that the sidewalls of the connector will be held against lateral movement when the connector is located in the end of the plunger thereby to localize the deformation of the connector in its web as described above.

The wire feeding mechanism is contained in a U-shaped bracket similar to the bracket 186, 187 and secured to the righthand side of the main frame block as viewed in FIGURE 31. This bracket has sides 238 and a web 239, the sides having flanges 240 thereon through which fasteners pass to secure the bracket to the frame block. A panel 242 is mounted on the under side of the bracket and a reciprocable wire feed slide 244 rests upon this panel and between the sidewalls of the bracket. A wire carrier tube 246 is clamped to slide 244 by means of a set screw 245 and projects towards the main frame block and through a bore therein. Wire carrier 246 has a depending fin 248 which is received within a slot 250 in the frame block 100 and has a nose portion 252 of square cross section which is adapted to be slidably received in a notch 157 of block 151 beneath the neck portion 153 thereof. The bore in the wire carrier tube is relatively large in the rearward portion of the tube and is of a smaller diameter as shown at 256 in the nose portion thereof to assist in guiding the wire during feeding. An aligned bore 258 is provided in block 244 and an additional bore 260 in the web 239 of the bracket, these bores being of stepped internal diameter to assist in maintaining the alignment of the wire during the feeding operation.

As is explained below, wire feeding is accomplished by pulling the wire from the coil and to this end a wire clamp piston 262 is provided in slide 244. This piston has a clamping finger 266 which projects into the bore 258 in the slide so that upon downward movement of this piston into the bore, the wire is held against relative movement with respect to the slide. Piston 262 is normally biased upwardly by means of the spring within the cylinder bore 264 in the slide and the piston is supplied with air to clamp the wire by means of a flexible air hose 268. A similar clamping arrangement (FIGURE 34) is provided in the web 239 of the bracket and comprises a clamping finger 272 movable through a passageway in the bracket web into the bore 260. This clamping finger extends from a clamping piston 270 in a cylindrical bore in the web. This piston is normally biased leftwardly by a spring 271 and is supplied with compressed air through a flexible air line 274 when the wire is clamped.

Slide member 244 is normally biased rightwardly as viewed in FIGURE 31 by means of a spring 276 which acts between the slide member and a bracket 278 secured to the upper surface of the main frame block, a pin 280 advantageously being provided in the bracket to retain the spring in its proper position. The slide member 244 is moved leftwardly in FIGURE 31 to feed the wire by means of a piston rod 282 of a pneumatic piston cylinder 284 secured to hte web 239 of the bracket and supplied with compressed air through an air line 286.

In use, the embodiment of FIGURE 27 is positioned over the terminal post 10 and supported by means of its legs 124 during the applying operation. Since perfect alignment of the plunger with respect to the terminal post is difficult to achieve, there is provided means for swinging the frame block 100 with respect to the frame housing until substantially perfect alignment is achieved. The means for aligning the frame block in this manner comprises a pair of holding fingers 290 (FIGURES 28 and 30) which are slidable against inclined surfaces 288 on the underside of the frame block and are guided in their movement by means of slots 291 and machine screws 293 in the frame block which are received in the slots. The outer ends of the fingers have flanges 292 thereon and are secured to the ends of piston rods 294 of pneumatic piston cylinders 296 which in turn are secured by means of obliquely extending brackets 298 to the sides of the frame block. The ends of the fingers 290 each have an inwardly directed straight surface 302 and an arcuate surface 300 so that upon movement of the fingers towards each other along oblique paths towards the terminal post, the post is clamped between the two fingers and against the corners formed by the surfaces 300, 302. During such movement of the fingers, the entire frame block will be swung a slight distance to bring about alignment between the punch and the terminal post.

The operating cycle of this embodiment of the invention is as follows. At the beginning of the cycle, the parts will be in the position of FIGURE 27 with the connector transfer slide, the wire feed tube, and the plunger 216 in their retracted positions. It is understood that the various pneumamtic pistons will be actuated in the sequence described below either manually or preferably automatically by, for example, solenoid valves controlled by cams or switches.

Compressed air is first supplied to the cylinders 296 to drive the holding fingers 290 relatively towards each other. As explained immediately above, in the case of misalignment, the main frame block will be swung by these fingers and by their engagement with the terminal post a distance sufficient to bring the plunger into substantial perfect alignment with the terminal post. Thereafter, air is supplied to wire clamp 262 in wire feed slide 244 to clamp the wire in the feed slide and the slide is thereafter driven leftwardly in FIGURE 31 to pull the wire relatively over the anvil. See FIGURE 36. The wire is then unclamped in slide 244 by exhausting the compressed air from wire clamp 262 and the wire is clamped within the web 239 by admitting compressed air to the wire clamp 270, (see FIGURE 34). Air is then exhausted from piston cylinder 284 and the slide 244 is allowed to return to its normal position under the influence of spring 276. At this stage in the cycle, the wire will extend from the nose of the wire feed tube past the path of reciprocation of the plunger and over the anvil as is shown in FIGURE 37.

The connector transfer slide 202 is then moved rightwardly in FIGURE 31 by admitting compressed air to piston cylinder 190 so that the leading connector of the strip, which is located on the extension 208 of slide 202 is sheared from the strip by the edge 212 in the feed block 166. The remaining slug or tab on the lower end of the connector is simultaneously removed by the edge 214 on the tongue 160 and this slug drops downwardly into bore 139 from which it is removed by a blast of compressed air. Upon further rightward movement of the transfer slide 202, the connector is pushed into the recess 232 in the lower end of the plunger until it is lodged therein with its sidewalls held between the opposed sidewalls of the plunger as is shown in FIGURE 37.

The transfer slide remains in its extended position of FIGURES 37 until the pluunger 216 begins its downward movement and carries the connector off of and past the transfer slide after which the slide may be returned to its starting position. The plunger moves downwardly past the wire and pulls the wire down against the anvil so that the edges on each side of the groove 144 cut into the wire insulation as was previously described. At this time, the connector is slid downwardly over the T-shaped anvil 142 and its sidewalls are retained between the sidewalls of the plunger so that the web of the connector yields under the jamming influence of the wire rather than the connector sidewalls which are supported. The wire end during this interval, is drawn out of its insulation and into the tapering groove 144 and the insulation remains on the top of the anvil plate and drops into the cavity 146 from whence it is removed by compressed air. The aligning fingers 290 are retracted during the downward travel of the plunger to permit the connector to move downwardly onto the terminal post as is indicated in FIGURE 38. The plunger then retracts and the connector feeding mechanism is actuated to feed the next connector of the strip downwardly over the T-shaped extension 208 of the feed slide.

Where two different terminal posts are being electrically connected, the apparatus is then repositioned over the second post and a substantially similar operating cycle is followed. The cycle for the second post, however, differs from the foregoing in that during wire feeding, the wire is dragged forwardly towards the central portion of the main frame block by the feed slide until it is gripped between the serrated ends 156 of the springs 154 as is shown in FIGURES 39 and 40. Upon further forward movement of the wire feed slide, the wire is sheared by the lower edge 304 of the nose portion of the feed slide and the edge 306 of the block 158. The section of insulation which remains between the ends 156 of the springs is removed in the subsequent operating cycle of the same type. That is, as the wire is pulled past the fingers, it dislodges the remaining insulation and moves it into recess 146. In other respects, this operating cycle is substantially the same as the operating cycle for the first connector as is described above.

Where a relatively large panel is being wired, the apparatus of FIGURE 27 can be mounted on a coordinately movable frame and positioned over the various posts which are to be wired in the order in which they are to be connected to each other and among each other. Multiple connections can be made with a single post by merely stacking the connectors on top of each other on the posts.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A method of making an electrical connection between a terminal member and a conductor by means of a connecting member, said terminal member having a free end and a fixed end, said connecting member being longitudinally movable with respect to said terminal member over said free end and beyond said free end into assembled relationship with said terminal member, said method comprising the steps of positioning said conductor with its axis extending transversely of a path of relative movement of said connecting member into assembled relationship with said terminal member, moving said connecting member along said path and against said conductor to form a bight in said conductor at the point of engagement of said connecting member and said conductor, whereby upon moving said connecting member further along said path and over and beyond said free end of said terminal member, said bight and said conductor are dragged along said path by means of said connecting member so that said conductor is held between said connecting member and said terminal member after said terminal member comes to rest with said bight proximate to said fixed end of said terminal member.

2. A method as set forth in claim 1 wherein said terminal member comprises a post and said connecting member comprises a clip which is axially movable over said free end of said post, and into embracing relationship with said post.

3. A method as set forth in claim 1 wherein said terminal member comprises a post and said connecting member comprises a clip having an axially extending open seam on one side thereof, and said wire is positioned with its axis extending transversely of said path and through the side of said path along which said one side of said clip travels and through the side of said path along which the side opposite to said one side travels.

4. A method as set forth in claim 1 including the step of positioning a connecting member guide means on said path and between said free end of said terminal member and said conductor, said connecting member being moved along said path and over said guide means whereby, said conductor is dragged over said guide means 5. A method as set forth in claim 1 wherein said terminal member comprises a terminal post and said connecting member comprises a clip having an axially extending open seam on one side thereof, said method including the step of positioning a mandrel guide on said path and between said terminal member and said conductor, said mandrel guide being dimensioned to internally support said clip, and said clip drags said conductor over surface portions of said mandrel guide during movement along said path.

6. A method as set forth in claim 5 wherein said mandrel guide has insulation severing means thereon for circumferentially severing insulation on said conductor during dragging of said conductor by said clip over said mandrel guide, and said conductor is withdrawn from said insulation during further dragging of said conductor along said path.

References Cited by the Examiner

UNITED STATES PATENTS

| 2,181,576 | 11/1939 | Chirelstein | 29—203 X |
| 2,198,966 | 4/1940 | Herman | 29—206 |
| 2,681,440 | 6/1954 | Swengel | 339—223 |
| 2,759,163 | 8/1956 | Ustin et al. | 339—223 |
| 2,780,794 | 2/1957 | Cresson | 339—276 |
| 2,873,511 | 2/1959 | Folkenroth | 29—155.55 |
| 2,961,753 | 11/1960 | Willis et al. | 29—206 |
| 2,974,400 | 3/1961 | Sowa | 29—155.55 |
| 3,040,150 | 6/1962 | Rueger | 339—95 X |

WHITMORE A. WILTZ, *Primary Examiner.*

JOHN F. CAMPBELL, *Examiner.*